US007945146B2

(12) United States Patent
Cabrera

(10) Patent No.: US 7,945,146 B2
(45) Date of Patent: May 17, 2011

(54) TANKLESS HOT WATER HEATER WITH POWER MODULATION

(75) Inventor: Carlos Antonio Cabrera, Miramar, FL (US)

(73) Assignee: Ecosmart US LLC, Miami Lakes, FL (US)

( * ) Notice: Subject to any disclaimer, the term of this patent is extended or adjusted under 35 U.S.C. 154(b) by 605 days.

(21) Appl. No.: 12/136,034

(22) Filed: Jun. 9, 2008

(65) Prior Publication Data

US 2009/0129763 A1 May 21, 2009

Related U.S. Application Data

(60) Provisional application No. 60/933,593, filed on Jun. 7, 2007.

(51) Int. Cl.
*A47J 31/00* (2006.01)

(52) U.S. Cl. ........................................ 392/466; 392/465

(58) Field of Classification Search ........... 392/465–496
See application file for complete search history.

(56) References Cited

U.S. PATENT DOCUMENTS

| | | | | |
|---|---|---|---|---|
| 7,088,915 | B1 * | 8/2006 | Sturm et al. | 392/466 |
| 7,164,851 | B2 * | 1/2007 | Sturm et al. | 392/463 |
| 2008/0107410 | A1 * | 5/2008 | White | 392/466 |
| 2009/0092384 | A1 * | 4/2009 | Luo et al. | 392/488 |
| 2009/0129763 | A1 * | 5/2009 | Cabrera | 392/466 |

* cited by examiner

*Primary Examiner* — Daniel Robinson
(74) *Attorney, Agent, or Firm* — McNeely, Hare & War, LLP; William D. Hare

(57) ABSTRACT

A tankless hot water heater includes a pipe, at least one heating element, sensors, an input means and a microprocessor. The pipe has an inlet and an outlet. The at least one heating element is configured to heat water flowing through the pipe. At least one sensor is configured to measure a temperature of water flowing through the pipe prior to heating by the at least one heating element. At least one sensor is configured to measure a flow rate of water flowing through the pipe. The input means is configured for entering a set point for a temperature of water heated by the at least one heating element. The microprocessor is configured to receive as input the temperature of water flowing through the pipe prior to heating, the flow rate of water flowing through the pipe, and the set point for a temperature of heated water, and the microprocessor is configured to provide as output a power setting to the one or more heating elements.

18 Claims, 13 Drawing Sheets

TANKLESS HOT WATER HEATER WITH POWER MODULATION

CROSS-REFERENCE TO RELATED APPLICATIONS

This application claims priority from provisional patent application No. 60/933,593, filed on Jun. 7, 2007, the contents of which are incorporated herein in their entirety by reference.

TECHNICAL FIELD

The field of the invention generally relates to tankless hot water heaters and methods of controlling the energy usage of the tankless hot water heater.

BACKGROUND

Every household and many businesses require hot water for everyday use. These hot water consumers typically rely on conventional storage water heaters to store and constantly heat water for production upon demand.

A variety of fuel options are available for conventional storage water heaters, including electricity, natural gas, oil, and propane. Ranging in size from 20 to 80 gallons (75.7 to 302.8 liters), storage water heaters remain the most popular type for residential heating needs in the United States. A storage heater operates by releasing hot water from the top of the tank when the hot water tap is turned on. To replace that hot water, cold water enters the bottom of the tank, ensuring that the tank is always full.

Because the water is constantly heated in the tank, energy can be wasted even when no faucet is on. This is called standby heat loss. It is possible to completely eliminate standby heat losses from the tank and reduce energy consumption 20% to 30% with demand (tankless) water heaters, which do not have storage tanks. Cold water travels through a pipe into the unit, and either a gas burner or an electric element heats the water only when needed.

Tankless water heaters save energy because they do not need to constantly heat water in a large storage tank. To achieve this, tankless water heaters instantaneously heat water as it is passing from the consumer's water supply to the outlet (e.g. faucet or showerhead). The tankless water heater, therefore, needs to "know" when hot water is in demand in order to function properly. Flow switches are used to signal the tankless water heater that the consumer desires hot water. Briefly, when a consumer turns on a faucet or a dishwasher, any hot-water-requiring device, water flows from the water supply through the tankless water heater system. This flow of water causes the flow switch to activate the heating element (e.g. gas or electric) of the tankless water heater.

U.S. Pat. No. 5,408,578 to Bolivar (the '578 patent), the contents of which are incorporated herein by reference, describes a continuous flow water heater assembly requiring no storage tank and including an entrance chamber having a flow control switch mounted therein adapted to be activated upon a positive flow of water through the system. The water flows from the entrance chamber to a plurality of heating elements each of which are at least partially segregated by virtue of their being removably mounted within separate heating chambers. The heating chambers are attached in fluid communication to one another by a plurality of at least two ports which are of proportionately different sizes such that water will be passed between the first and second heating chambers in proportionately different amounts through the different sized ports. According to the '578 patent, water is thereby distributed between the heating elements so as to prevent exposure of the heating elements when activated and thereby eliminate either of the heating elements from being exposed to air and thereby subject to burnout.

U.S. Pat. No. 5,479,558 to White, Jr. et al. (the '558 patent), the contents of which are incorporated herein by reference, describes a compact tankless water heater that is characterized as delivering heat in proportion to demand. A flow responsive valve energizes an electrical control system and is purely flow responsive, even to minute flow, and consumes no power when dormant. An electronic control system is connected to power by the flow switch, and is substantially de-energized when dormant. Most electronic components of the control system are mounted on the flat front wall of the pressure vessel. Thus, the '558 patent is characterized as having minimized overall dimensions with cool water serving as a heat sink and heat generated by electronic controls being captured for heating purposes. In particular, triacs control the heating elements and are cooled to prolonging their life.

Further, the inventor is unaware of tankless electric hot water heaters that supply power to the heating elements to heat the water in a proportion that varies based on the amount of water that must be heated and the temperature difference between the temperature of the water and the temperature to which the water must be heated. Instead, most tankless electric hot water heaters merely supply 100% of the maximum power or 0% of the maximum power, i.e., completely on or completely off. This is not as efficient a method of heating water as one would prefer.

SUMMARY

In one general aspect, a tankless hot water heater includes a pipe, at least one heating element, sensors, an input means and a microprocessor. The pipe has an inlet and an outlet. The at least one heating element is configured to heat water flowing through the pipe. At least one sensor is configured to measure a temperature of water flowing through the pipe prior to heating by the at least one heating element. At least one sensor is configured to measure a flow rate of water flowing through the pipe. The input means is configured for entering a set point for a temperature of water heated by the at least one heating element. The microprocessor is configured to receive as input the temperature of water flowing through the pipe prior to heating, the flow rate of water flowing through the pipe, and the set point for a temperature of heated water, and the microprocessor is configured to provide as output a power setting to the one or more heating elements.

Embodiments of the tankless hot water heater may include one or more of the following features. For example, the microprocessor may be programmed with one or more look up tables for providing power specifications for the heating elements based on the water inlet temperature and the water flow rate provided to the microprocessor. The microprocessor may be programmed with one or more look up tables for providing power specifications for the heating elements based on the water inlet temperature, the water flow rate and the set water outlet temperature provided to the microprocessor.

The hot water heater may include one heating element. The hot water heater may include three heating elements. The amount of power provided to the one or more heating elements may be proportional to one or both of the increase in temperature to which the water must be heated and the flow rate of the water that must be heated.

In another general aspect, a controller for a tankless hot water heater includes a microprocessor configured to receive as inputs the temperature of water flowing to the hot water heater, the flow rate of water flowing through the hot water heater, and the set point for a temperature of heated water leaving the hot water heater. The controller is configured to provide as output a power setting to one or more heating elements associated with the hot water heater, the power setting being modulated to provide a power to the one or more heating elements based on inlet water temperature, water flow rate and the set point for the temperature of the heated water.

Embodiments of the controller may include one or more of the following features. For example, the microprocessor may be is programmed with one or more look up tables for providing power specifications for the one or more heating elements based on the water inlet temperature and the water flow rate provided to the microprocessor. The microprocessor may be programmed with one or more look up tables for providing power specifications for the one or more heating elements based on the water inlet temperature, the water flow rate and the set water outlet temperature provided to the microprocessor.

The controller may further include a pipe having an inlet and an outlet and one or more heating element configured to heat water flowing through the pipe.

The hot water heater may include one or three heating elements.

The amount of power provided to the one or more heating elements may be proportional to one or both of the increase in temperature to which the water must be heated and the flow rate of the water that must be heated.

In another general aspect, a method for controlling the temperature of water heated in a tankless hot water heater includes the steps of:

using a microprocessor to receive from sensors measurements of the inlet water temperature and water flow rate of water supplied to an inlet pipe in the hot water heater;

using a microprocessor to receive a setting for a water outlet temperature of heated water;

using the microprocessor to send as an output a signal corresponding to an amount of power required to heat the water to the set temperature for the water outlet temperature of the heated water; and supplying electrical power to one or more heating elements configured to heat water passing through the hot water heater.

Embodiments of the method may include one or more of the following features. For example, the hot water heater may include a pipe having an inlet and an outlet;

at least one heating element configured to heat water flowing through the pipe;

at least one sensor configured to measure a temperature of water flowing through the pipe prior to heating by the at least one heating element;

at least one sensor configured to measure a flow rate of water flowing through the pipe;

at least one input means configured for entering a set point for a temperature of water heated by the at least one heating element; and the microprocessor.

The microprocessor may include software programmed with one or more look up tables for providing power specifications for the heating elements based on the water inlet temperature and the water flow rate provided to the microprocessor.

The microprocessor may include software programmed with one or more look up tables for providing power specifications for the heating elements based on the water inlet temperature, the water flow rate and the set water outlet temperature provided to the microprocessor. The amount of power provided to the one or more heating elements may be proportional to one or both of the increase in temperature to which the water must be heated and the flow rate of the water that must be heated.

The details of various embodiments of the invention are set forth in the accompanying drawings and the description below. Other features and advantages of the invention will be apparent from the description, the drawings, and the claims.

DETAILED DESCRIPTION

The inventor has developed control systems for electric hot water heaters that are designed to provide energy efficiency while providing consistent water temperature control over a large range of water flow rates. The energy efficiency is provided by controlling the amount of electricity provided to the water heater based on one or more of inlet water temperature, water flow rate, desired water output temperature, and measured water output temperature. Compared to the prior art, the inventor's hot water heater modulates electrical current and/or power to the heating elements rather than providing electric current and/or power to the heating elements based on one power level (e.g., 100%) or a small, inefficient number of power levels (e.g., low, medium, high). As a result of this efficient use of current and/or power, the inventors hot water heater can provide water at the desired temperature over a wide range of flow rates.

Figure 1:
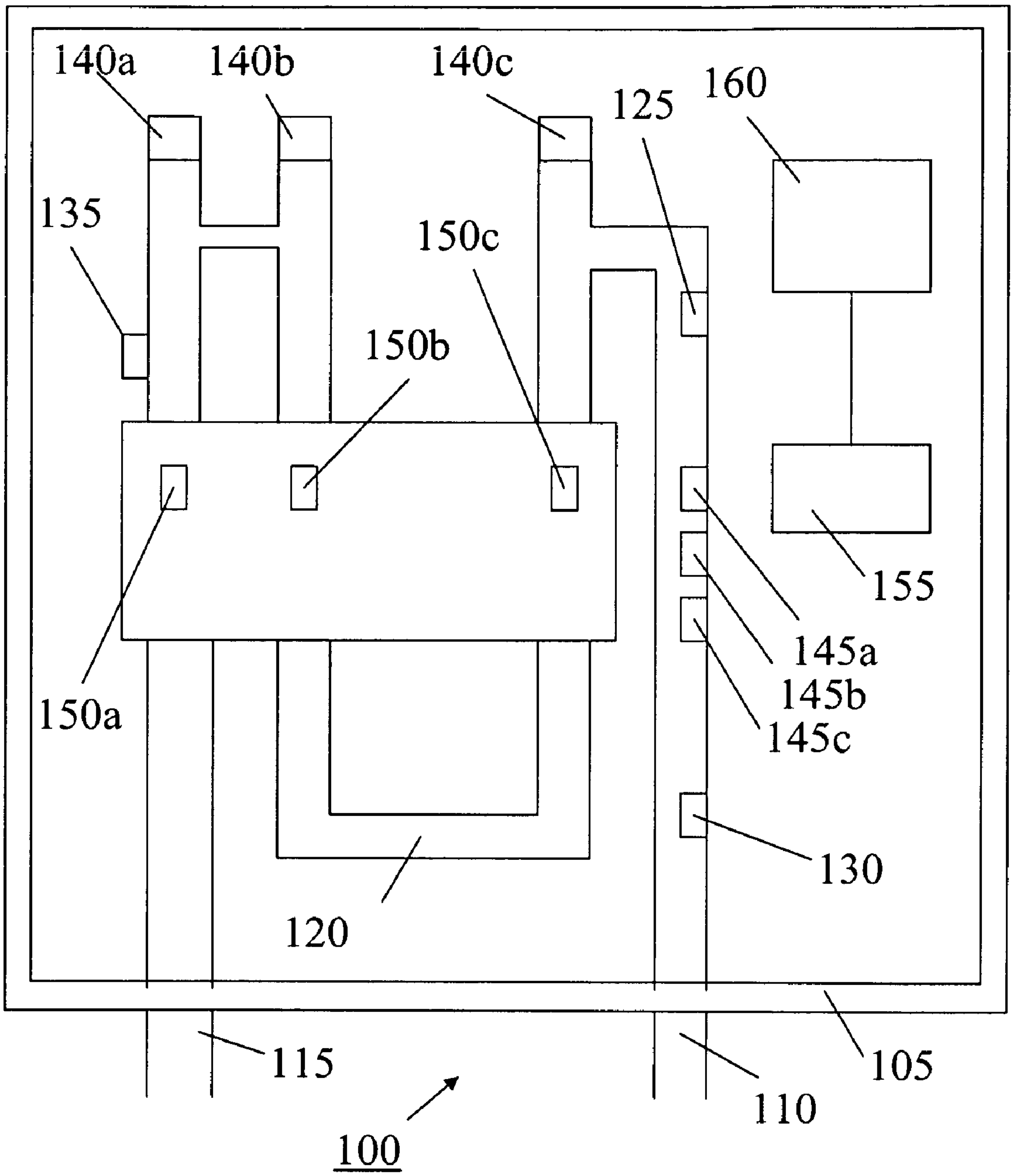
FIG. 1 is a plan view of a tankless electric hot water heater.

Referring to FIG. 1, a tankless electric hot water heater 100 includes a case 105 through which pass a water inlet pipe 110 and a water outlet pipe 115. Water that is heated in the hot water heater 100 passes through a pipe 120 that connects the water inlet pipe 110 to the water outlet pipe 115. The pipes 110, 115 and 120 can be made of any conventional piping material, such as copper, brass, stainless steel, aluminum, plastic, polymer, glass, ceramic, etc. As the water passes through the pipe 120, its inlet water temperature and water flow rate are measured at an inlet water temperature sensor 125 and its water flow rate is measured at a water flow rate sensor 130. After being heated, as described in more detail below, the water outlet temperature is measured at water outlet temperature sensor 135.

The water is heated by a series of heating elements 140*a*, 140*b* and 140*c* mounted in the pipe 120. The heating elements are used to heat the water as it passes through the heating chambers (not shown) mounted within the pipe 120. The heating elements may be coated with stainless steel to resist dissolved minerals such as calcium (hard water) and iron. The heating chambers are made of a metal that will resist the expansion and contraction caused by rapid heated and cooling. For example, the metals may be made of copper and brass welded together with silver.

The degree of heating provided by the heating elements is controlled at the individual element level by individual time proportional heating devices (TRIAC) 145*a*, 145*b*, 145*c*, respectively. The TRIACs regulate power to the heating element and provide control of very large power flows with milliampere-scale precision. The TRIACS 145_a_, 145_b_, 145_c_ may be mounted on one or more heat-diffusing plates. The one or more heat diffusing plates may be optionally mounted to the pipe 120 so that the plate and TRIACs are cooled by the water flowing through the inlet water line.

The hot water heater 100 may be further provided with protection for the heating elements and for users of the hot water by using individual automatic thermal limit switches 150_a_, 150_b_, 150_c_ to turn off the heating element if a potentially unsafe output water temperature is reached. This reduces the risk for scalding injuries and protects the unit from damage in the event of a power surge or other unusual event.

The hot water heater 100 also includes a temperature input panel 155 for setting water output temperature. The temperature input panel 155 can be made up of rocker switches or the like and may include a display to indicate the specification set by the user for the water output temperature.

Figure 2:
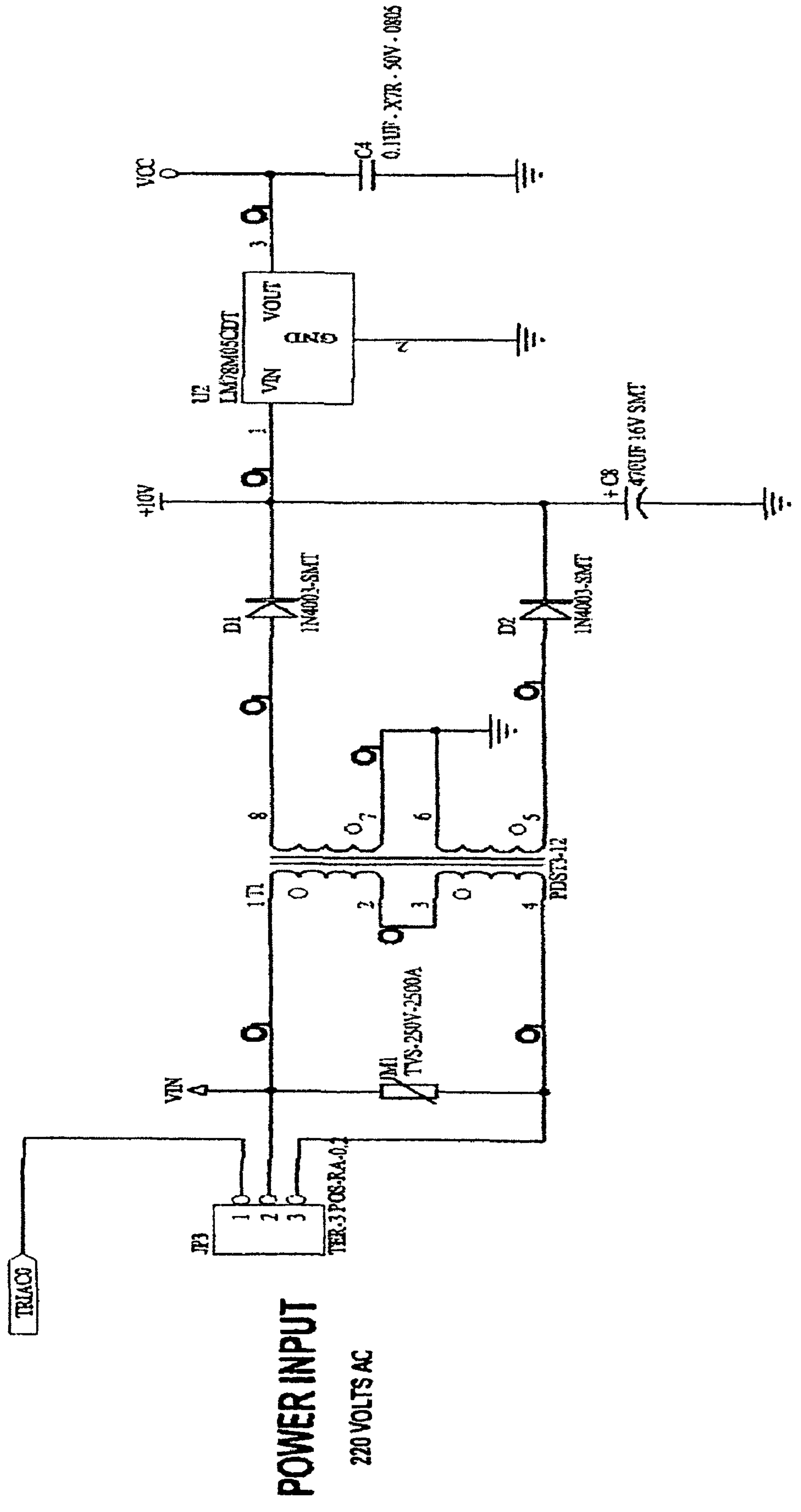
FIG. 2 is a schematic of one embodiment of a power circuit for the hot water heater of FIG. 1.
Figure 3:
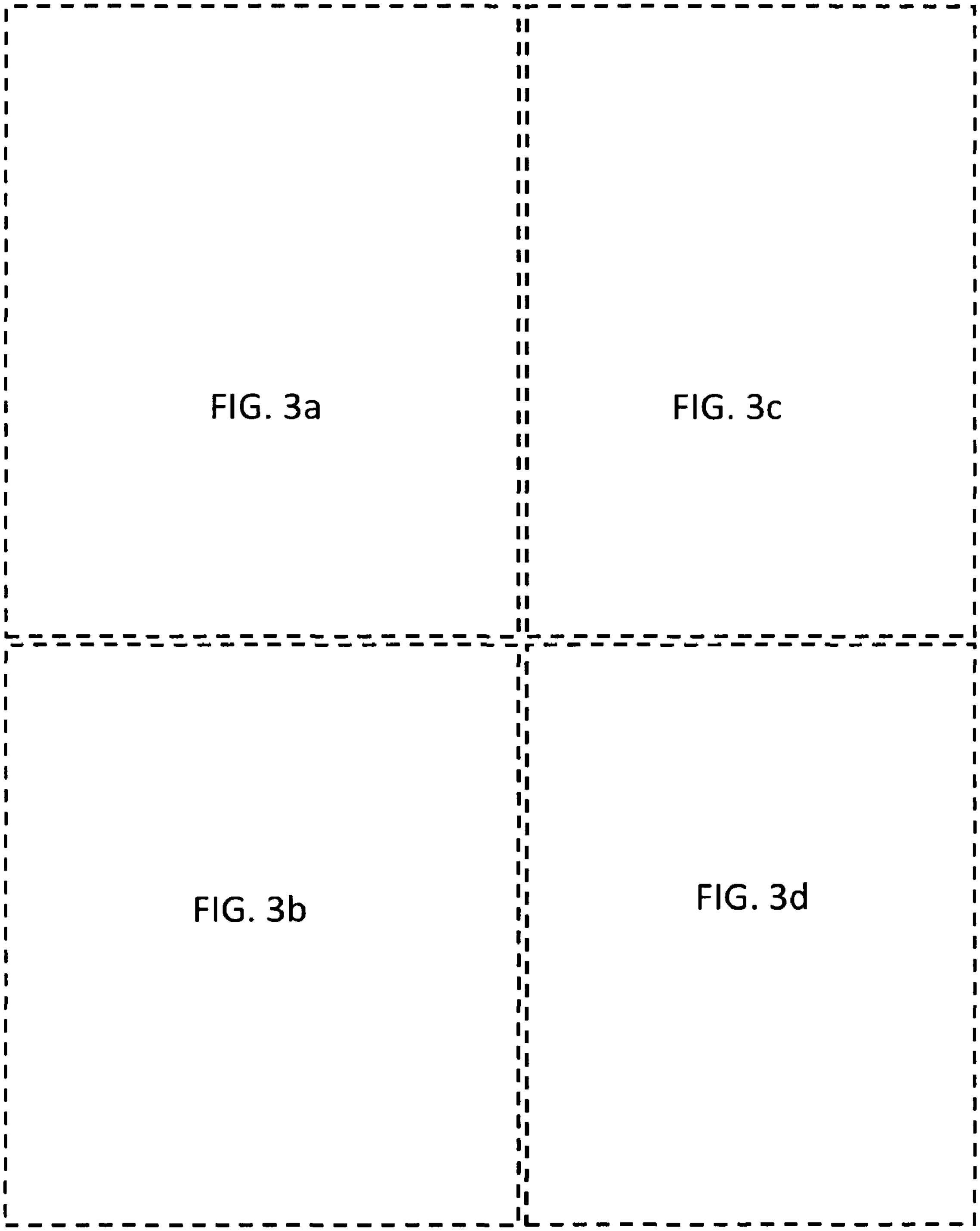
FIG. 3 is a schematic of one embodiment of a digital display circuit for the hot water heater of FIG. 1.
Figure 3A:
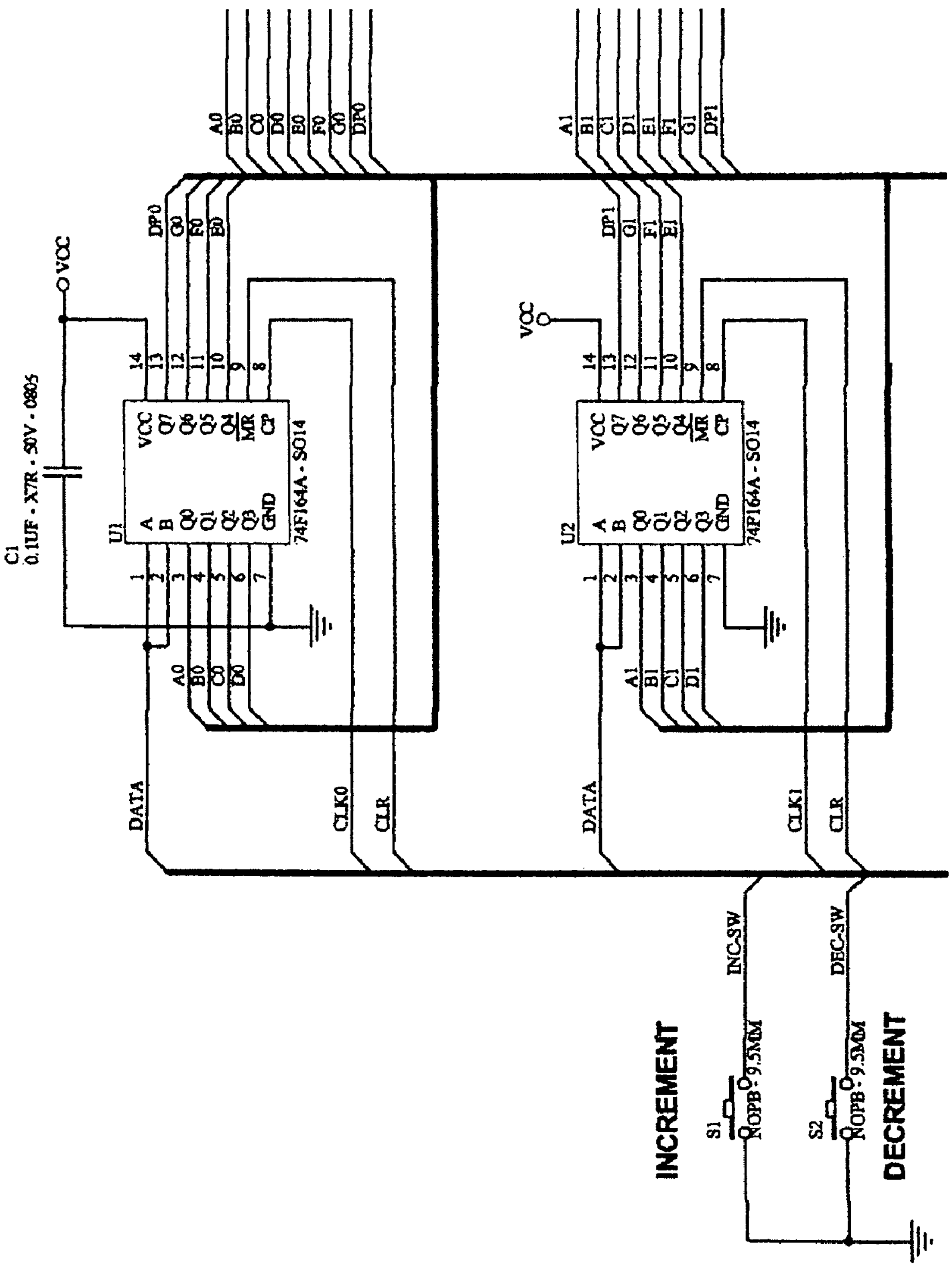
Figure 3B:
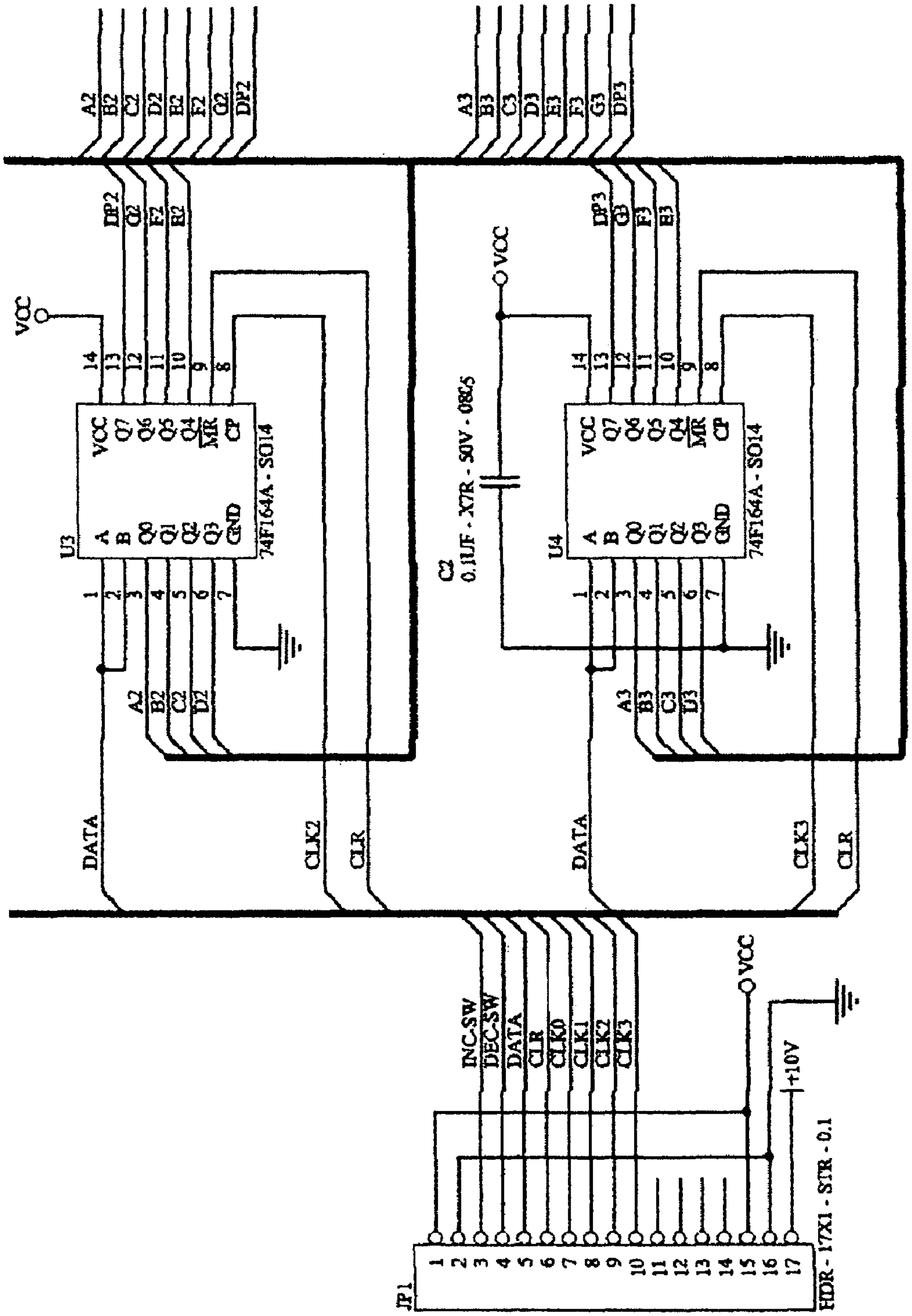
Figure 3C:
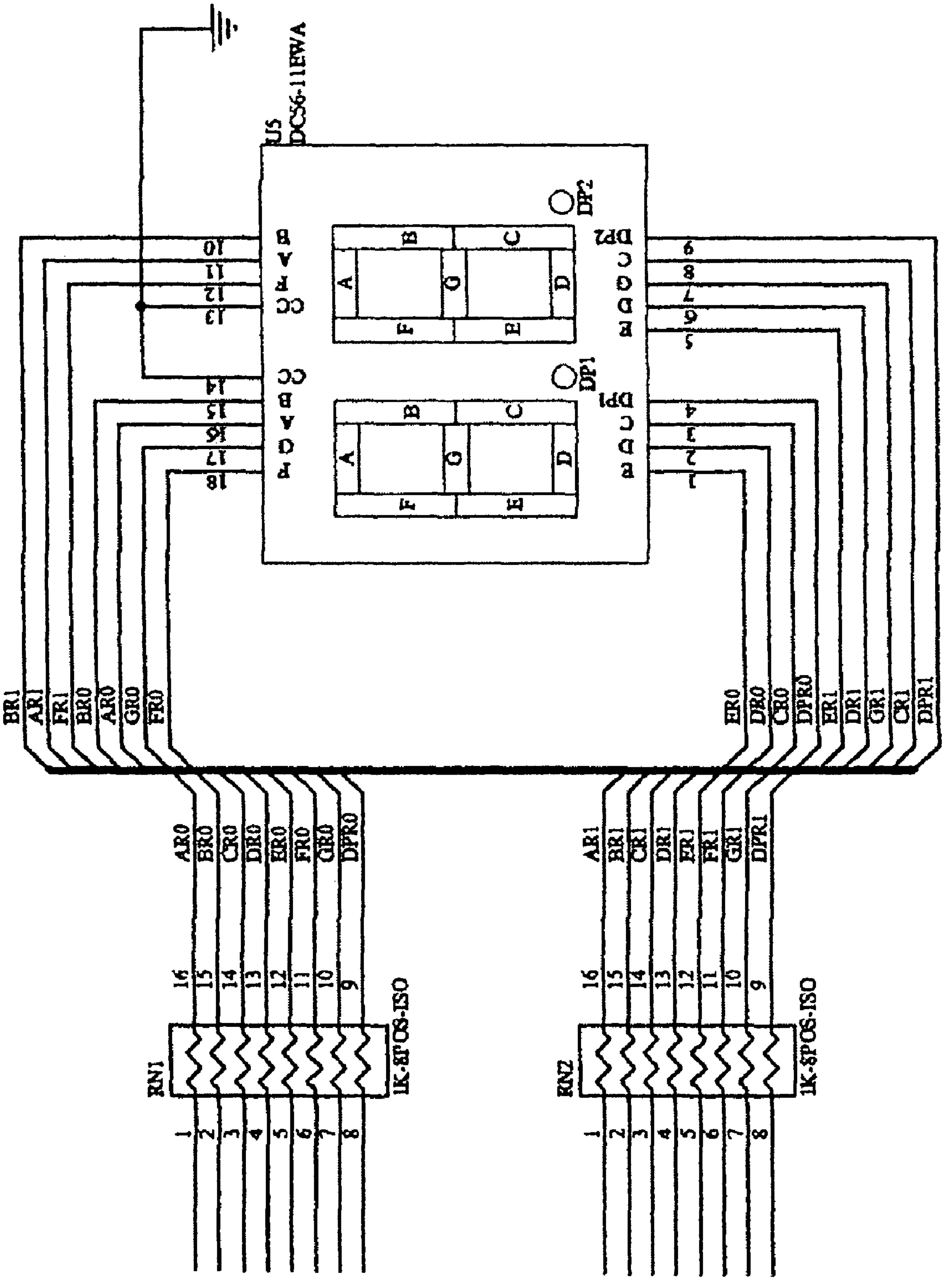
Figure 3D:
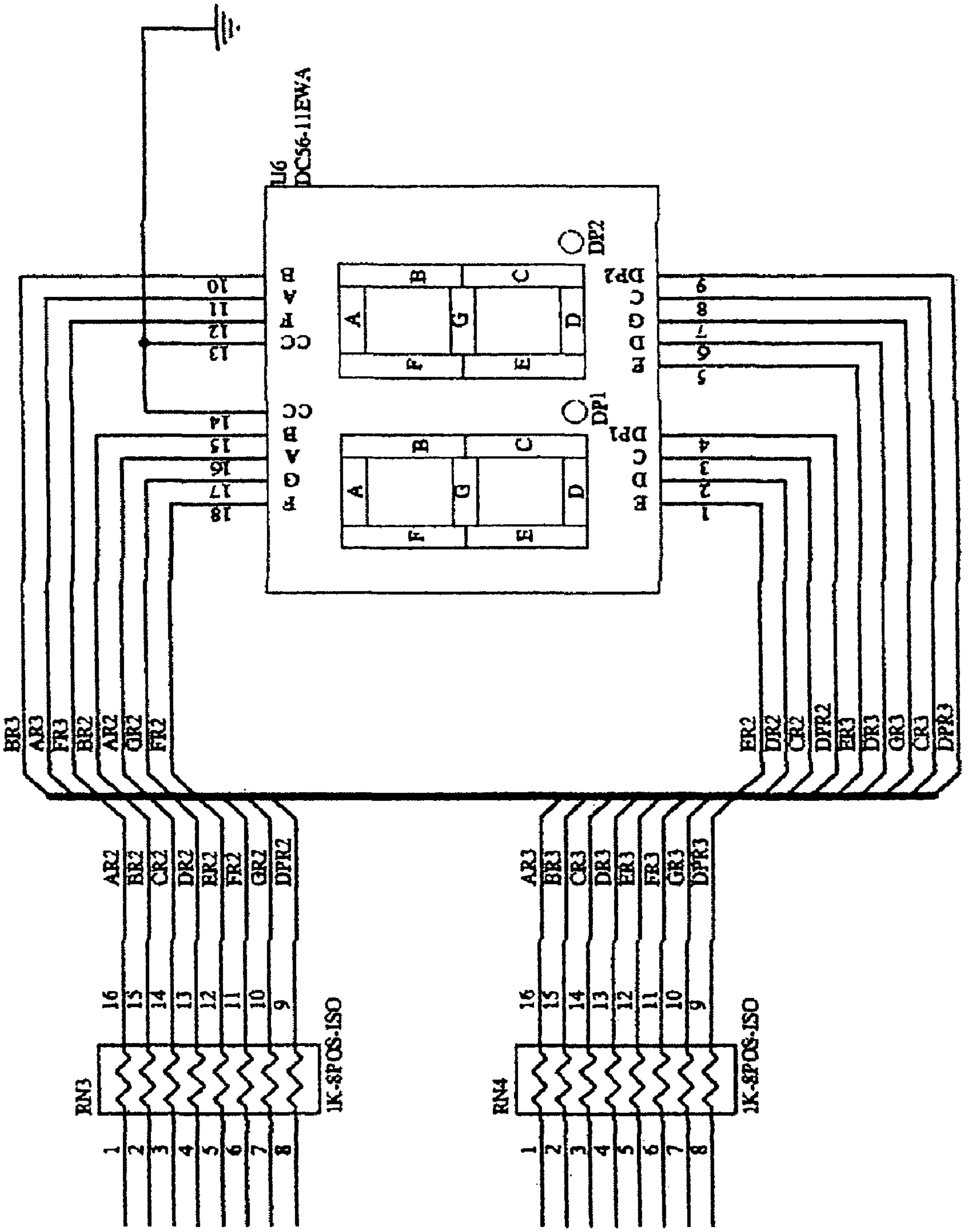
Figure 4:
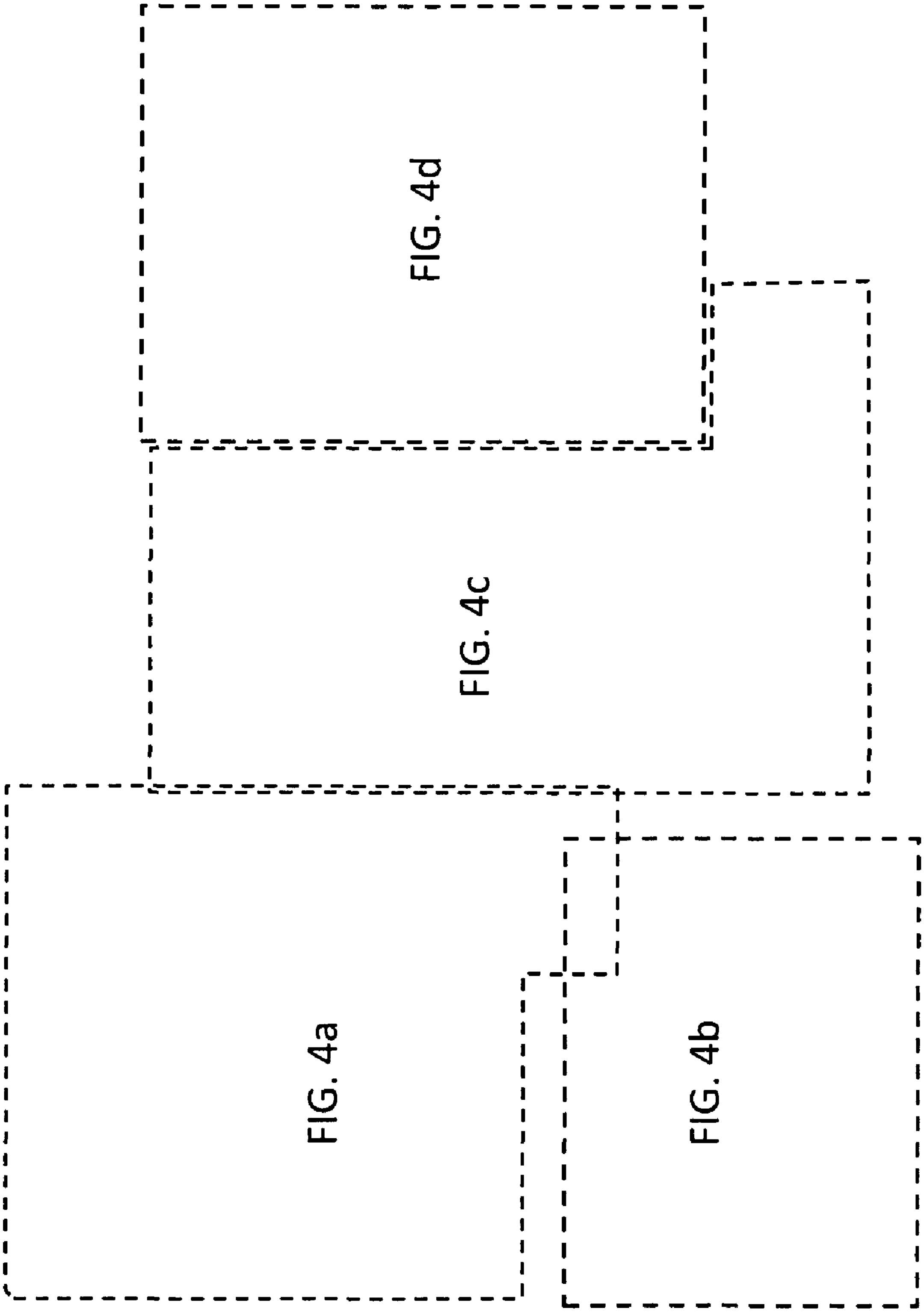
FIG. 4 is a schematic of one embodiment of a CPU circuit for the hot water heater of FIG. 1.
Figure 4A:
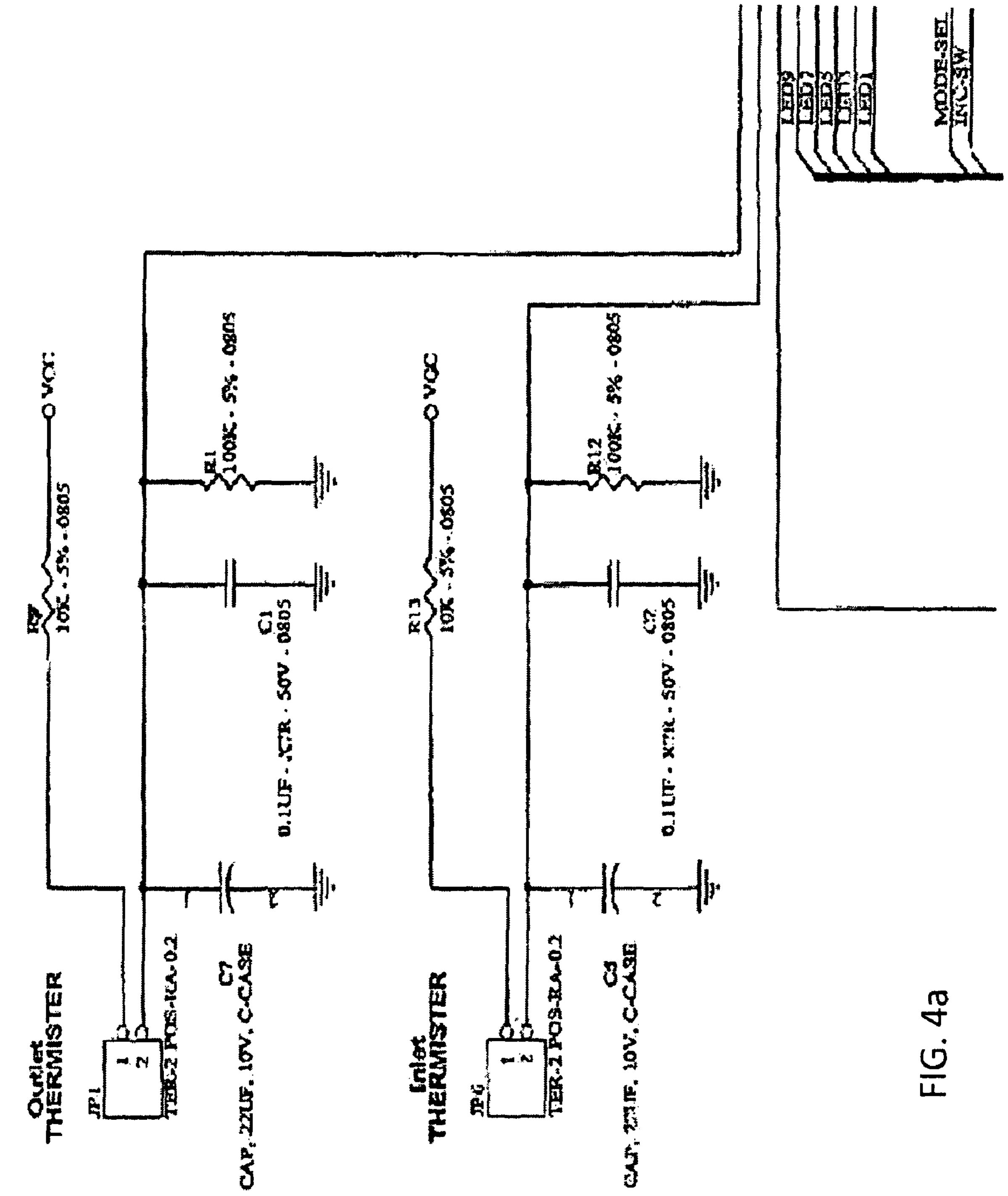
Figure 4B:
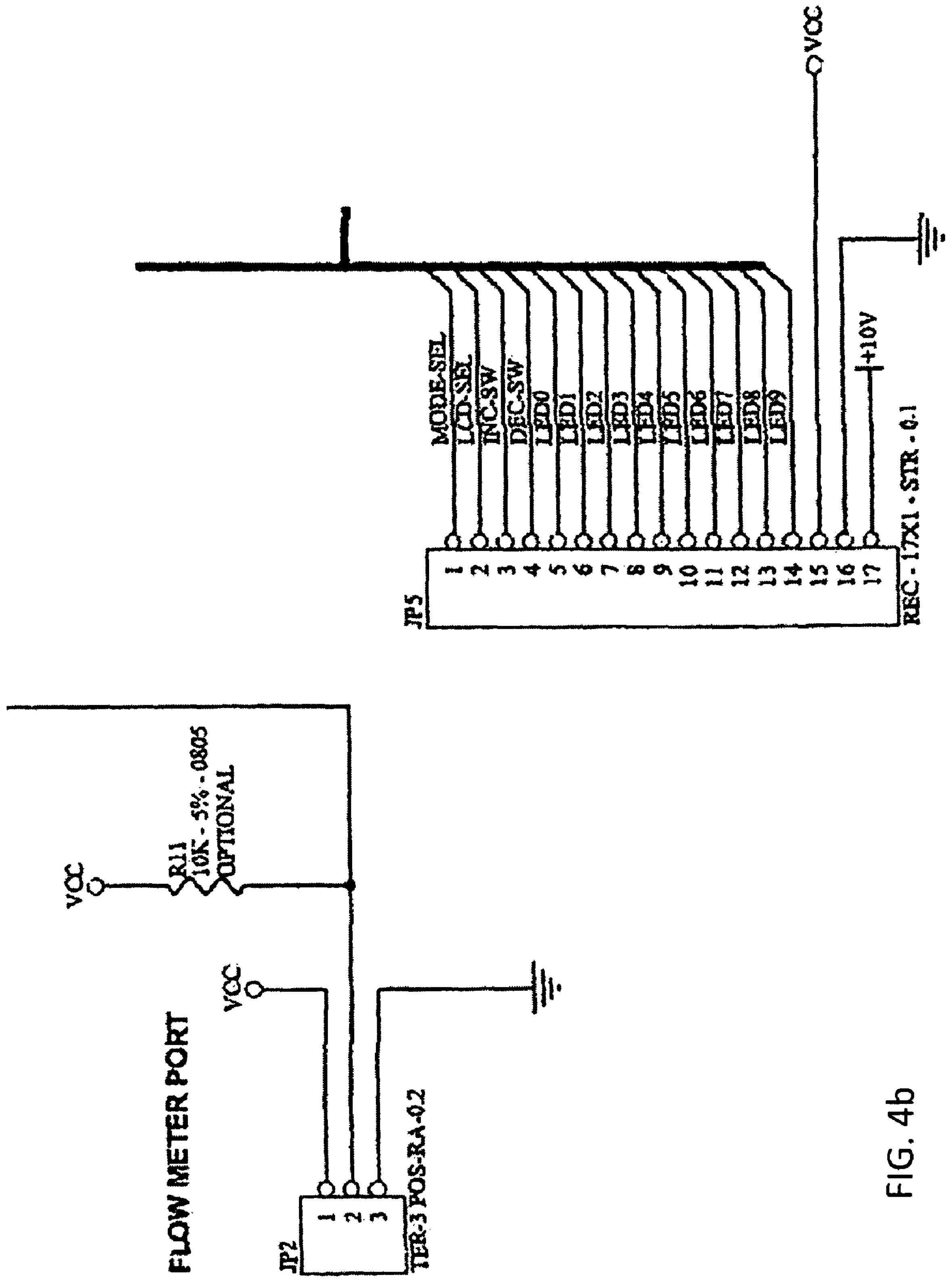
Figure 4C:
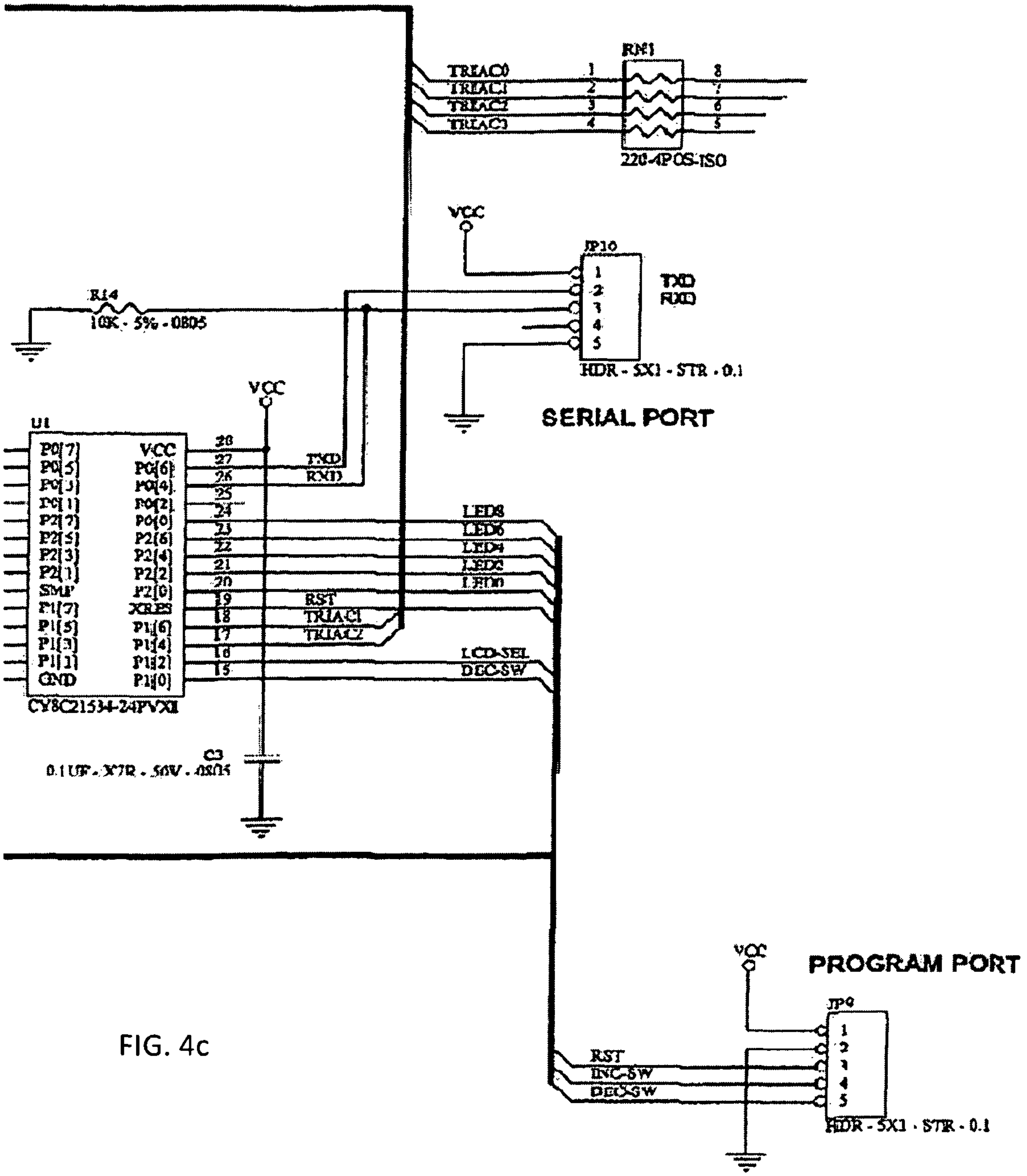
Figure 4D:
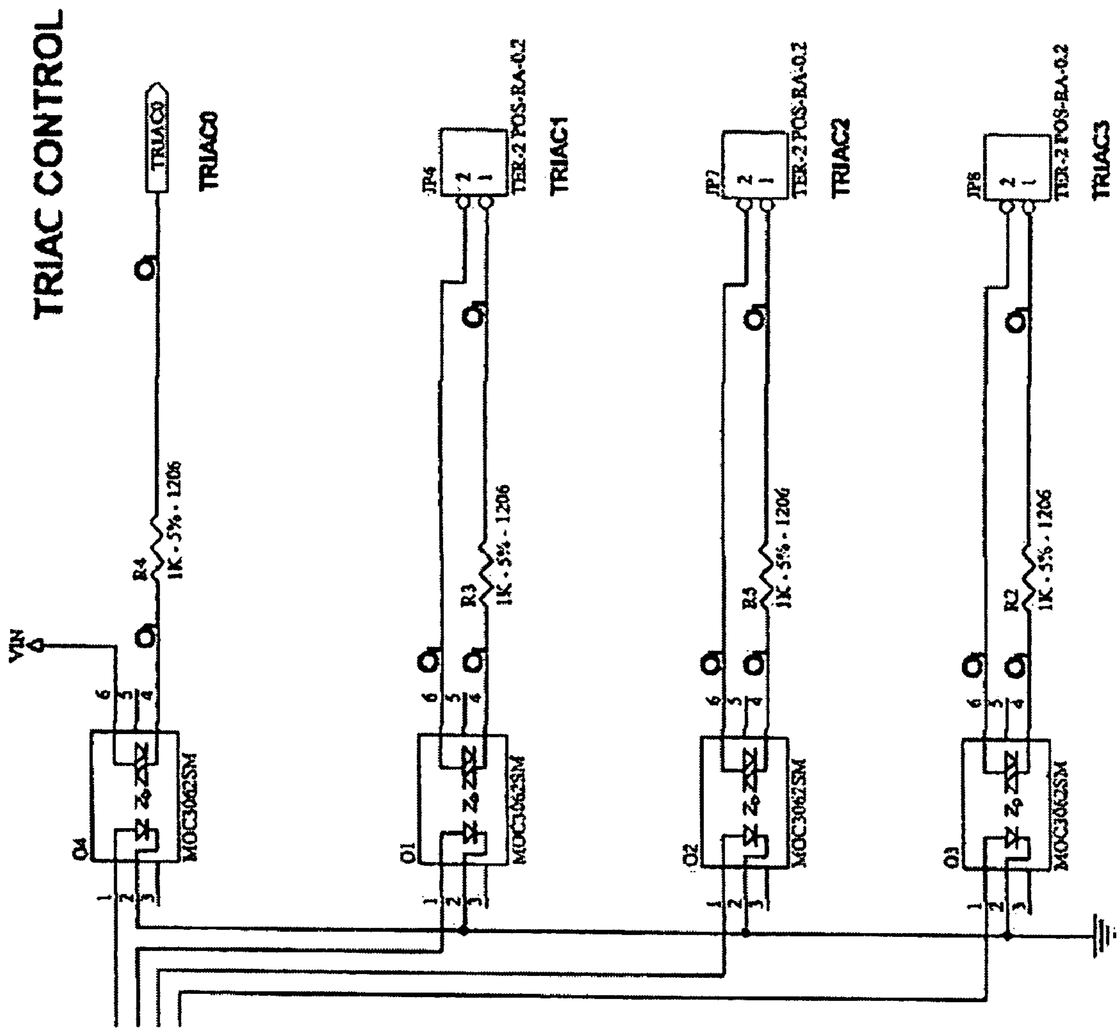

Referring also to FIGS. 2-4, the components of the hot water heater 100 are generally electrically linked to each other by a microprocessor 160 that is contained within the case 105. FIG. 2 is a schematic of one embodiment of a power circuit for the hot water heater 100. FIG. 3 is a schematic of one embodiment of a digital display circuit for the hot water heater 100. FIG. 4 is a schematic of one embodiment of a CPU circuit for the hot water heater 100. These figures illustrate the electrical and signal connections between the microprocessor 160 and the water flow rate sensor 125, the water inlet temperature sensor 130, the water outlet temperature sensor 135, the heating elements 140_a-c_, the TRIACs 145_a-c_, the automatic thermal limit switches 150_a-c_ and the temperature input panel 155.

Figure 5:
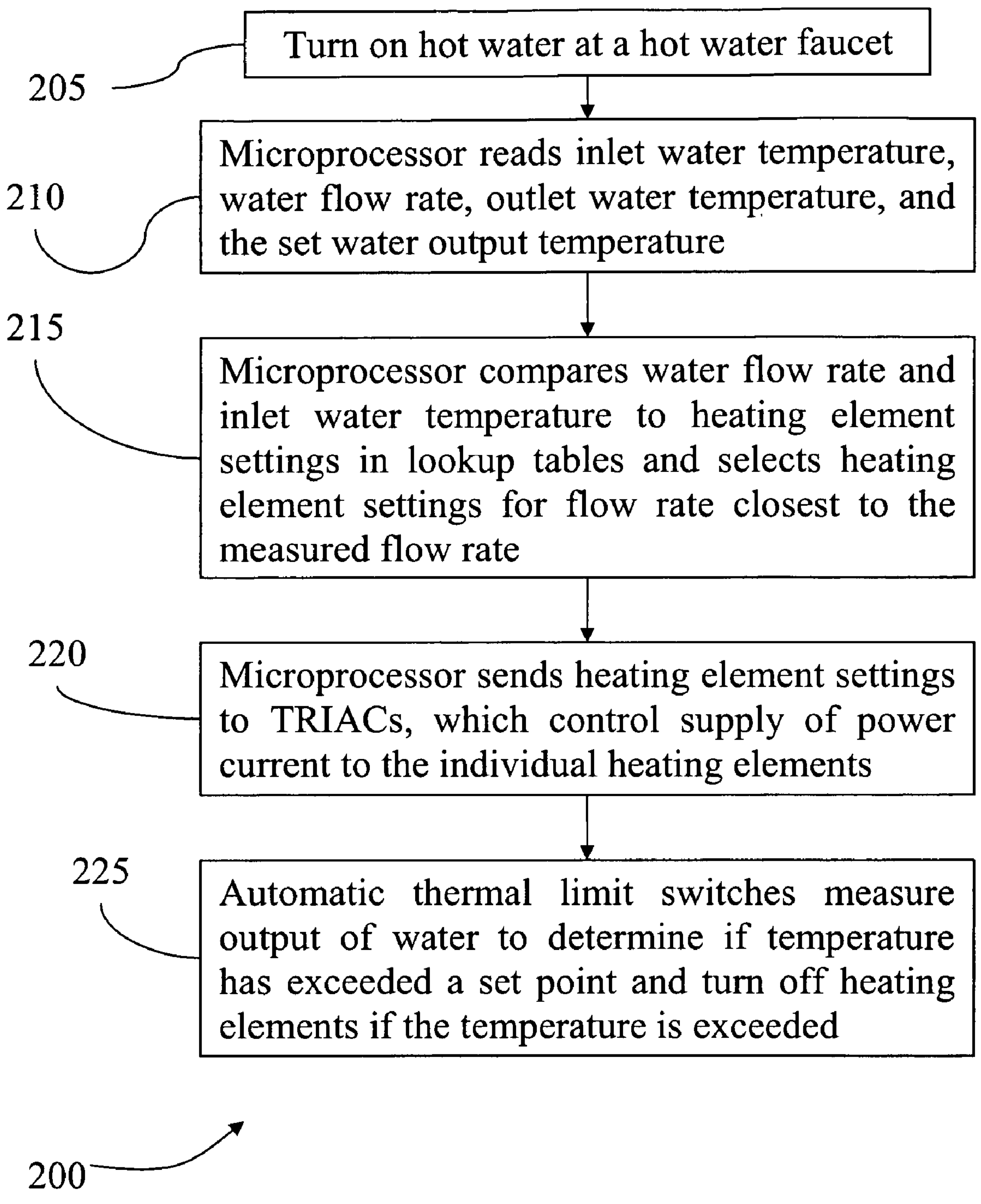
FIG. 5 is a flow chart illustrating the control of the power to the heating elements during use of the tankless electric hot water heater of FIG. 1.

Referring also to FIG. 5, according to a process 200, to use the hot water heater 100, a patient initially turns on the hot water at a faucet (step 205), which causes water to flow through the pipes 110, 120 and 115. According to step 210 as the water passes through the pipe 120, the flow rate of the water is measured at water flow rate sensor 130 and that flow rate information measured at the sensor 130 is provided to the microprocessor 160. Similarly, according to step 210 the water inlet temperature is measured at the water inlet temperature sensor 125 and that temperature information is provided to the microprocessor 155. Optionally, the water output temperature may be measured at the water outlet temperature sensor 135 and that temperature information provided to the microprocessor 155. Finally, according to step 210 the information set at the temperature input panel 155 is provided to the microprocessor 155. These temperatures and flow rate are constantly measured while water is flowing through the hot water heater.

Based on the measured flow rate and the inlet water temperature, the microprocessor compares those values to look up tables loaded into memory associated with the microprocessor (step 215). The look up tables have power settings for controlling the heating elements to provide water at the temperature set by the user. Thus, at one particular combination of water flow rate and water inlet temperature, the microprocessor finds the closest values and selects the corresponding power to the heating element. The microprocessor then uses the heating element settings to control the TRIACs and their supply of power to the heating elements (step 220). Although monitoring the temperature continuously, the automatic thermal limit switches measure the water temperature as heated water passes through the heating elements (step 225). If the temperature exceeds as set point, e.g., 120° F., the switches will turn off the TRIACs to prevent producing water at a temperature that is harmful for the hot water heater of that is likely to injure a person using the hot water.

It should be noted that the look up tables can be configured to cover a wide range of temperatures, e.g., 80° F. to 140° F., and flow rates, 0.1 gallon per minute to 10 gallons per minute. Of course, look up tables associated with wider or narrower ranges of temperature and flow rate can be used by the hot water heater 100. One advantage of the look up tables is the responsiveness with which the microprocessor can respond to changes in inlet water temperature and flow rate. Rather than performing calculations, the microprocessor can quickly compare the measured values and quickly select the appropriate power settings.

The above explanation of the process of using the hot water heater 100 described the situation in which a person turns on a single faucet. A similar process occurs when users turn on subsequent faucets. For example, if a person turns on a second faucet, the water flow rate sensor 130 will provide a new value for the water flow rate. This new water flow rate is provided to the microprocessor 160, which then follows steps 210 through 225 of process 200 to use the look up tables to set a new power setting for the heating elements. As such, the microprocessor rapidly increases the power to the heating elements through the TRIACs to ensure that at most there is only a momentary drop in temperature at the water outlet. In other words, the microprocessor modulates power to the heating elements modulated in accordance with changes in incoming flow rate. The microprocessor also can modulate power to the heating elements based on a change in inlet water temperature.

As should be evident from the above description of the hot water heater 100 and the process of its use 200, the tankless hot water heater provides energy efficiency by a number of techniques. First, the tankless hot water heater uses only the power to reach the desired outlet water temperature. In this manner, the hot water is not heated beyond the temperature at which it is set to be supplied at. Second, the tankless water heater remains on only so long as a hot water faucet is open and drawing hot water. As soon as the flow sensor 130 detects that water has stopped flowing, the power to the unit is completely turned off. Third, the tankless hot water heater does not store heated water. Instead, the water is heated only to a set temperature at the time of use.

Because of the ability to modulate the power to the heating elements only to the extent needed, the hot water heater 100 can be used for applications such as a back up for a solar water heater. In this manner, the water supplied to the hot water heater 100 may be from a solar water heater. The water may be supplied to the hot water heater 100 at, for example 98° F. and if the set outlet temperature is 110° F., the hot water heater will modulate the power supplied to the heating elements to raise the water temperature by twelve Fahrenheit degrees.

As described above, this ability to modulate the power rapidly is based, in part, on the look up tables. The look up tables allow the tankless hot water heater 100 to be serviced and to check and/or modify the power options. The look up tables and software programmed on the microprocessor 160 can be loaded into the microprocessor. The values that can be uploaded are based on the inlet temperature and the flow rate variables as well as the outlet water temperature that is set. In one embodiment, the tables include 10 settings covering 80 degrees F. to 125 degrees F. in 5 F degree increments. Each setting is broken down into ¼ gallon flow rates and changes can be made to each of the 10 settings in ¼ gallon changes up to an unlimited amount of elements if desired. The tables or software associated with the look up tables also have variables within it to automatically adjust the power for changes on the inlet temperature (for example if the inlet is cooler by 6 degrees the electronic boards software, e.g. microprocessor, instantly compensates for this change, and vice versa if warmer temperature is fed to the inlet.

Further, in one implementation of the hot water heater 100, using a laptop with a USB port, a connection can be made to the microprocessor to analyze all of the operations of the hot water heater, e.g., the Inlet Water Temperature, the Flow Rate, the Power draw by every ¼ gallon flow, the Outlet Temperature, the heating elements firing up and at what rate etc. This makes the hot water heater 100 easy to use and troubleshoot.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Similarly, although FIG. 1 illustrates the hot water heater 100 having three heating elements 140*a-c*, either more or fewer heating elements may be used depending upon the application. Thus, where greater flow rates are needed and/or the inlet water temperature is lower, more heating elements may be used. Similarly, for a low flow application and/or where the inlet water temperature is higher, fewer heating elements may be used. Accordingly, it is not intended that the invention be limited, except as by the appended claims.

What is claimed is:

1. A tankless hot water heater comprising:

a pipe having an inlet and an outlet;

at least one heating element configured to heat water flowing through the pipe;

at least one sensor configured to measure a temperature of water flowing through the pipe prior to heating by the at least one heating element;

at least one sensor configured to measure a flow rate of water flowing through the pipe;

at least one input means configured for entering a set point for a temperature of water heated by the at least one heating element; and a microprocessor, wherein the microprocessor is configured to receive as input the temperature of water flowing through the pipe prior to heating, the flow rate of water flowing through the pipe, and the set point for a temperature of heated water, and the microprocessor is configured to provide as output a power setting to the one or more heating elements.

2. The tankless hot water heater of claim 1, wherein the microprocessor is programmed with one or more look up tables for providing power specifications for the heating elements based on the water inlet temperature and the water flow rate provided to the microprocessor.

3. The tankless hot water heater of claim 1, wherein the microprocessor is programmed with one or more look up tables for providing power specifications for the heating elements based on the water inlet temperature, the water flow rate and the set water outlet temperature provided to the microprocessor.

4. The tankless hot water heater of claim 1, wherein the hot water heater comprises one heating element.

5. The tankless hot water heater of claim 1, wherein the hot water heater comprises three heating elements.

6. The tankless hot water heater of claim 1, wherein the amount of power provided to the one or more heating elements is proportional to one or both of the increase in temperature to which the water must be heated and the flow rate of the water that must be heated.

7. A controller for a tankless hot water heater, the controller comprising a microprocessor being configured to receive as inputs the temperature of water flowing to the hot water heater, the flow rate of water flowing through the hot water heater, and the set point for a temperature of heated water leaving the hot water heater, and the controller configured to provide as output a power setting to one or more heating elements associated with the hot water heater, the power setting being modulated to provide a power to the one or more heating elements based on inlet water temperature, water flow rate and the set point for the temperature of the heated water.

8. The controller of claim 7, wherein the microprocessor is programmed with one or more look up tables for providing power specifications for the one or more heating elements based on the water inlet temperature and the water flow rate provided to the microprocessor.

9. The controller of claim 7, wherein the microprocessor is programmed with one or more look up tables for providing power specifications for the one or more heating elements based on the water inlet temperature, the water flow rate and the set water outlet temperature provided to the microprocessor.

10. The controller of claim 7, comprising:

a pipe having an inlet and an outlet; and the one or more heating element configured to heat water flowing through the pipe.

11. The controller of claim 10, wherein the hot water heater comprises one heating element.

12. The controller of claim 10, wherein the hot water heater comprises three heating elements.

13. The controller of claim 7, wherein the amount of power provided to the one or more heating elements is proportional to one or both of the increase in temperature to which the water must be heated and the flow rate of the water that must be heated.

14. A method for controlling the temperature of water heated in a tankless hot water heater, the method comprising:

using a microprocessor to receive from sensors measurements of the inlet water temperature and water flow rate of water supplied to an inlet pipe in the hot water heater;

using a microprocessor to receive a setting for a water outlet temperature of heated water;

using the microprocessor to send as an output a signal corresponding to an amount of power required to heat the water to the set temperature for the water outlet temperature of the heated water; and supplying electrical power to one or more heating elements configured to heat water passing through the hot water heater.

15. The method of claim 14, wherein the hot water heater comprises a pipe having an inlet and an outlet;

at least one heating element configured to heat water flowing through the pipe;

at least one sensor configured to measure a temperature of water flowing through the pipe prior to heating by the at least one heating element;

at least one sensor configured to measure a flow rate of water flowing through the pipe;

at least one input means configured for entering a set point for a temperature of water heated by the at least one heating element; and the microprocessor.

16. The method of claim 14, wherein the microprocessor comprises software programmed with one or more look up tables for providing power specifications for the heating elements based on the water inlet temperature and the water flow rate provided to the microprocessor.

17. The method of claim 14, wherein the microprocessor comprises software programmed with one or more look up tables for providing power specifications for the heating elements based on the water inlet temperature, the water flow rate and the set water outlet temperature provided to the microprocessor.

18. The method of claim 14, wherein the amount of power provided to the one or more heating elements is proportional to one or both of the increase in temperature to which the water must be heated and the flow rate of the water that must be heated.

* * * * *

US007945146C1

(12) INTER PARTES REEXAMINATION CERTIFICATE (1269th)

United States Patent

Cabrera

(10) Number: US 7,945,146 C1

(45) Certificate Issued: May 17, 2016

(54) TANKLESS HOT WATER HEATER WITH POWER MODULATION

(75) Inventor: Carlos Antonio Cabrera, Miramar, FL (US)

(73) Assignee: ECOSMART US LLC, Miami Lakes, FL (US)

Reexamination Request:
No. 95/001,823, Nov. 17, 2011

Reexamination Certificate for:

| | |
|---|---|
| Patent No.: | **7,945,146** |
| Issued: | **May 17, 2011** |
| Appl. No.: | **12/136,034** |
| Filed: | **Jun. 9, 2008** |

Related U.S. Application Data

(60) Provisional application No. 60/933,593, filed on Jun. 7, 2007.

(51) Int. Cl.

| | |
|---|---|
| ***A47J 31/00*** | (2006.01) |
| ***H05B 1/02*** | (2006.01) |
| ***F24H 9/20*** | (2006.01) |

(52) U.S. Cl.
CPC ............ *H05B 1/0244* (2013.01); *F24H 9/2028* (2013.01)

(58) Field of Classification Search
None
See application file for complete search history.

(56) References Cited

To view the complete listing of prior art documents cited during the proceeding for Reexamination Control Number 95/001,823, please refer to the USPTO's public Patent Application Information Retrieval (PAIR) system under the Display References tab.

*Primary Examiner* — Patricia Engle

(57) ABSTRACT

A tankless hot water heater includes a pipe, at least one heating element, sensors, an input means and a microprocessor. The pipe has an inlet and an outlet. The at least one heating element is configured to heat water flowing through the pipe. At least one sensor is configured to measure a temperature of water flowing through the pipe prior to heating by the at least one heating element. At least one sensor is configured to measure a flow rate of water flowing through the pipe. The input means is configured for entering a set point for a temperature of water heated by the at least one heating element. The microprocessor is configured to receive as input the temperature of water flowing through the pipe prior to heating, the flow rate of water flowing through the pipe, and the set point for a temperature of heated water, and the microprocessor is configured to provide as output a power setting to the one or more heating elements.

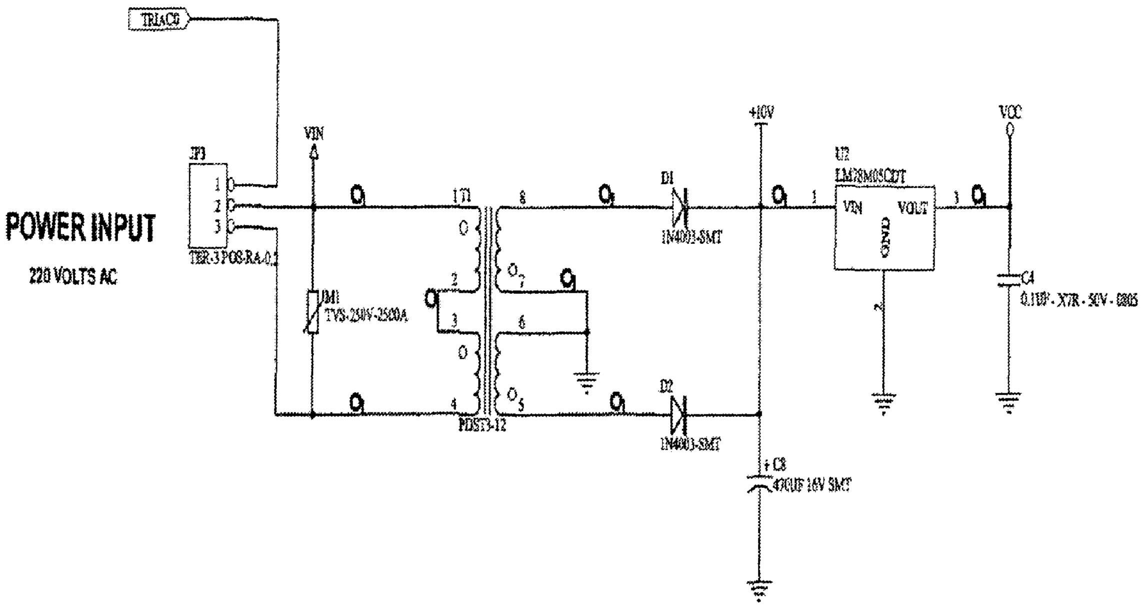

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1, 4-7, 10-15 and 18 are cancelled.

Claims 2, 3, 8, 9, 16 and 17 were not reexamined.

* * * * *